United States Patent
Barron et al.

(10) Patent No.: US 6,766,239 B2
(45) Date of Patent: Jul. 20, 2004

(54) ADVANCED WHEEL SLIP DETECTION USING SUSPENSION SYSTEM INFORMATION

(75) Inventors: Richard J. Barron, Ann Arbor, MI (US); Danny R. Milot, Ann Arbor, MI (US)

(73) Assignee: Kelsey-Hayes Company, Livonia, MI (US)

( * ) Notice: Subject to any disclaimer, the term of this patent is extended or adjusted under 35 U.S.C. 154(b) by 0 days.

(21) Appl. No.: 10/363,943

(22) PCT Filed: Sep. 7, 2001

(86) PCT No.: PCT/US01/27659

§ 371 (c)(1),
(2), (4) Date: Mar. 7, 2003

(87) PCT Pub. No.: WO03/022651

PCT Pub. Date: Mar. 20, 2003

(65) Prior Publication Data

US 2004/0024562 A1 Feb. 5, 2004

(51) Int. Cl.$^7$ ................................................. G06F 7/00
(52) U.S. Cl. .............................. 701/71; 701/70; 701/79; 701/82; 701/91; 180/197; 303/139
(58) Field of Search .............................. 701/70–72, 74, 701/78–79, 82, 91; 180/197; 303/138, 139, 176

(56) References Cited

U.S. PATENT DOCUMENTS

| 5,047,941 | A | * | 9/1991 | Seki .............................. 701/85 |
| 5,083,631 | A | * | 1/1992 | Nakayama et al. .......... 180/197 |
| 5,140,524 | A | * | 8/1992 | Matsuda ....................... 701/72 |
| 5,255,193 | A | * | 10/1993 | Katayose et al. ............. 701/83 |
| 5,357,434 | A | * | 10/1994 | Zimmer et al. ............... 701/75 |

FOREIGN PATENT DOCUMENTS

| DE | 34 45 002 A | 6/1985 |
| DE | 197 04 954 A | 8/1998 |
| EP | 0 704 703 A | 4/1996 |

* cited by examiner

Primary Examiner—Gertrude A. Jeanglaude
(74) Attorney, Agent, or Firm—MacMillan, Sobanski & Todd, LLC (57) ABSTRACT

The present invention determines a longitudinal wheel speed of an individual wheel from an angular rate signal from a wheel rotation sensor. Vehicle suspension information or operating characteristics are input to a suspension system mathematical model to determine instantaneous rolling radius, taking into account changes in tire rolling radius resulting from vertical motion of the road surface. Improved accuracy of wheel speed permits less severe filtering of wheel speeds in detecting wheel slip and/or modified speed and acceleration thresholds in slip control.

16 Claims, 7 Drawing Sheets

ADVANCED WHEEL SLIP DETECTION USING SUSPENSION SYSTEM INFORMATION

CROSS REFERENCE TO RELATED APPLICATIONS

This application claims the benefit of PCT International Application No. PCT/US01/27659, filed Sep. 7, 2001 and U.S. patent application Ser. No. 09/658,539, filed Sep. 9, 2000.

BACKGROUND OF THE INVENTION

The present invention relates in general to improving the determination of wheel speed for electronically-controlled vehicular braking systems, and, more specifically, to using suspension system information and a suspension system model to determine instantaneous wheel rolling radius for improved wheel speed calculation.

Electronically-controlled active vehicular braking systems include anti-lock braking (ABS), traction control (TC), and yaw stability control (YSC) functions. In such braking systems, sensors deliver input signals to an electronic control unit (ECU). The ECU sends output signals to electrically activated devices to apply, hold, and dump (relieve) pressure at wheel brakes of a vehicle. Electrically activated valves and pumps are used to control fluid pressure at the wheel brakes. Such valves and pumps can be mounted in a hydraulic control unit (HCU). The valves typically include two-state (on/off or off/on) solenoid valves and proportional valves.

A basic function of these braking systems is to detect wheel slip (e.g., skidding or loss of traction) and actuate the brakes (or reduce torque from the engine) in a manner to reduce or control wheel slip. An individual wheel speed is measured and wheel slip is detected by 1) comparing the individual wheel speed to the overall speed of the vehicle, and/or 2) monitoring the rate of change in the measured wheel speed. An angular rotation sensor mounted at the wheel produces pulses at a frequency proportional to the velocity at which the wheel spins. Using a predetermined nominal rolling radius of the particular wheel/tire combination, prior art systems convert the angular velocity of the wheel into a longitudinal speed for the particular wheel.

During actual driving conditions, the instantaneous rolling radius at a particular wheel will vary from the predetermined nominal rolling radius due to various forces acting on the tire, such as road undulations and load variations. The changes in rolling radius introduce error or noise into prior art wheel speed determinations. In order to avoid false activations of the braking system, the wheel speed needs to be filtered to remove this noise and/or the activation thresholds desensitized. Therefore, performance could be improved if a more accurate measurement of individual instantaneous wheel speed could be obtained.

Electronically-controlled suspension systems typically include semi-active suspension systems and active suspension systems to provide active damping for a vehicle. In such suspension systems, sensors deliver input signals to an electronic control unit (ECU). The ECU sends output signals to electrically activated devices to control the damping rate of the vehicle. Such devices include actuators to control fluid flow and pressure. The actuators typically include electrically activated valves such as two-state (digital) valves and proportional valves.

SUMMARY OF THE INVENTION

The present invention employs information from a suspension sensor to determine an instantaneous rolling radius for a particular wheel to improve a wheel speed measurement for that wheel.

According to one aspect of the invention, a method is provided for determining longitudinal speed of a vehicle wheel for use in a vehicle slip control system. An instantaneous angular rate of a vehicle wheel is measured via an individual wheel speed sensor. At least one operating characteristic of a portion of a vehicle suspension system associated with the vehicle wheel is measured, the suspension operating characteristic at least in part representative of an instantaneous rolling radius of the vehicle wheel. An instantaneous rolling radius deviation corresponding to the vehicle wheel is determined in response to the suspension operating characteristic. A longitudinal wheel speed signal is generated in response to the instantaneous angular rate and the instantaneous rolling radius deviation.

DETAILED DESCRIPTION OF PREFERRED EMBODIMENTS

Figure 1:
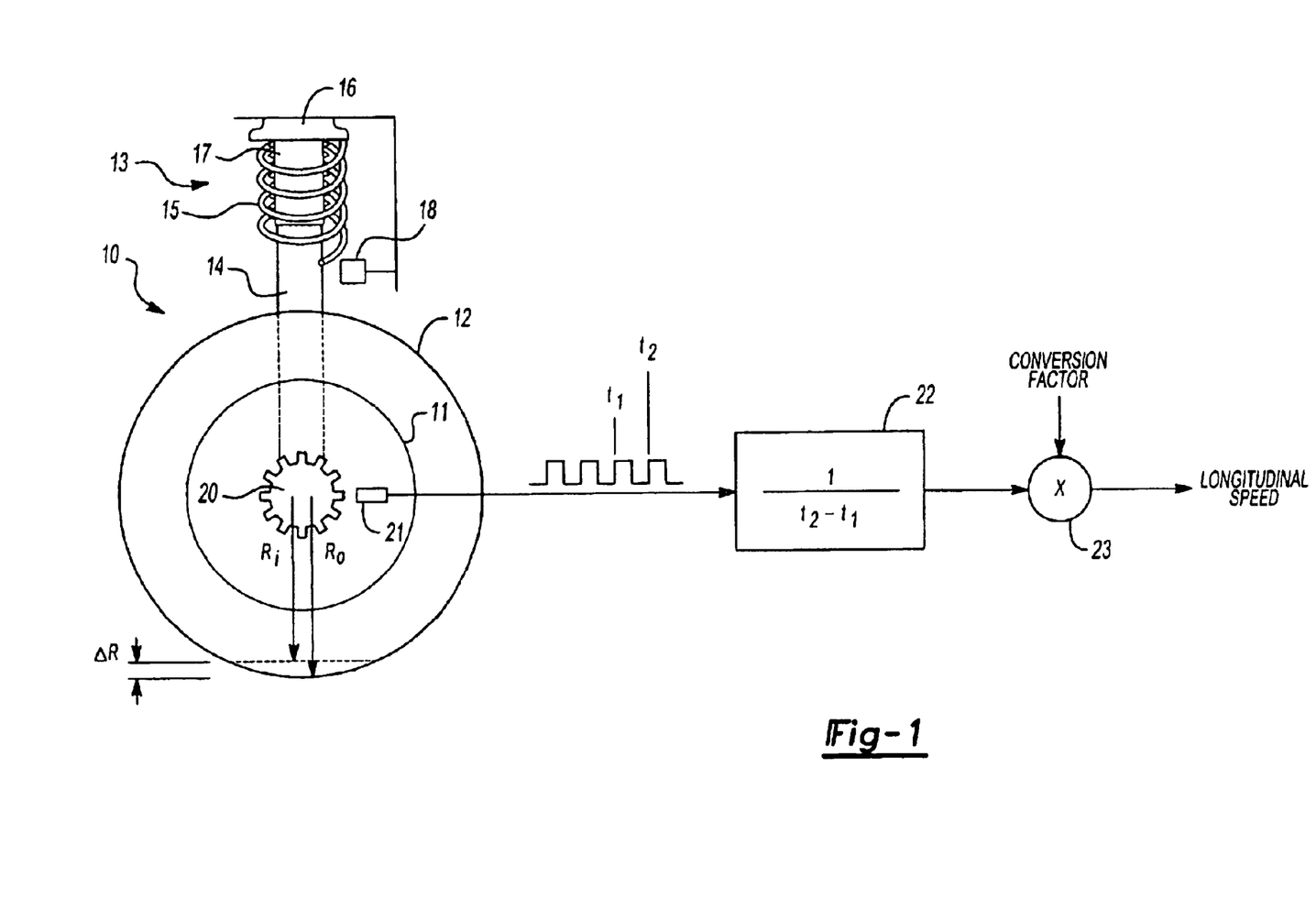
FIG. 1 is a schematic drawing showing a wheel, tire, and suspension components together with a wheel angular rate sensor and the calculations to determine longitudinal speed.

Turning to FIG. 1. a wheel for one particular corner of a vehicle is shown. A wheel assembly 10 includes a rim 11 and a tire 12. During smooth, steady state operation at specified conditions (such as specified tire pressure), tire 12 has a certain shape so that the rolling radius of wheel assembly 10 has a nominal radius $R_0$. During dynamic driving conditions, however, forces on tire 12 cause it to deform or deflect from its nominal shape resulting in variability of rolling radius. An instantaneous rolling radius $R_i$ varies from nominal radius $R_0$ by a radial deviation $\Delta R$, which may be positive or negative.

Wheel assembly 10 is connected to a suspension system 13. Associated with wheel assembly 10 are a strut 14 and a spring 15 connected to the vehicle by a strut retainer 16. A shock absorber 17 is coupled between strut 14 and strut retainer 16 to provide damping. Suspension system 13 may preferably is include an electronic suspension control system (not shown) for adjusting suspension performance (e.g., damping characteristics) in response to various operating characteristics of the suspension, such as strut displacement. A suspension sensor 18 (such as a displacement sensor mounted to a fixed part of the vehicle body or frame) measures at least one such operating characteristic, and may be part of an active suspension control system or may be dedicated for use with the active braking control system.

A toothed-wheel 20 is mounted for rotation with wheel assembly 10. A sensor 21 is mounted in a fixed location adjacent toothed-wheel 20 and may be a variable reluctance sensor or an optical sensor for generating an electrical pulse signal as known in the art. The resulting pulse signal has a pulse rate determined by the angular rotation rate of toothed-wheel 20. The period between leading pulse edges corresponds to the difference between times $t_1$ and $t_2$. The pulse frequency can be determined in a frequency calculator 22 as the inverse of the time difference $t_2$ minus $t_1$, or by counting a number of pulse edges detected during a fixed time window, for example. The pulse repetition frequency is multiplied in a multiplier 23 by a conversion factor to produce a longitudinal speed of the wheel. The conversion factor is a constant that relates the angular rotation frequency to a desired speed format (e.g., meters per second, miles per hour, etc.) and assumes a nominal rolling radius $R_0$. To the extent that the instantaneous rolling radius $R_i$ varies from $R_0$, the instantaneous longitudinal speed will be in error.

Figure 2:
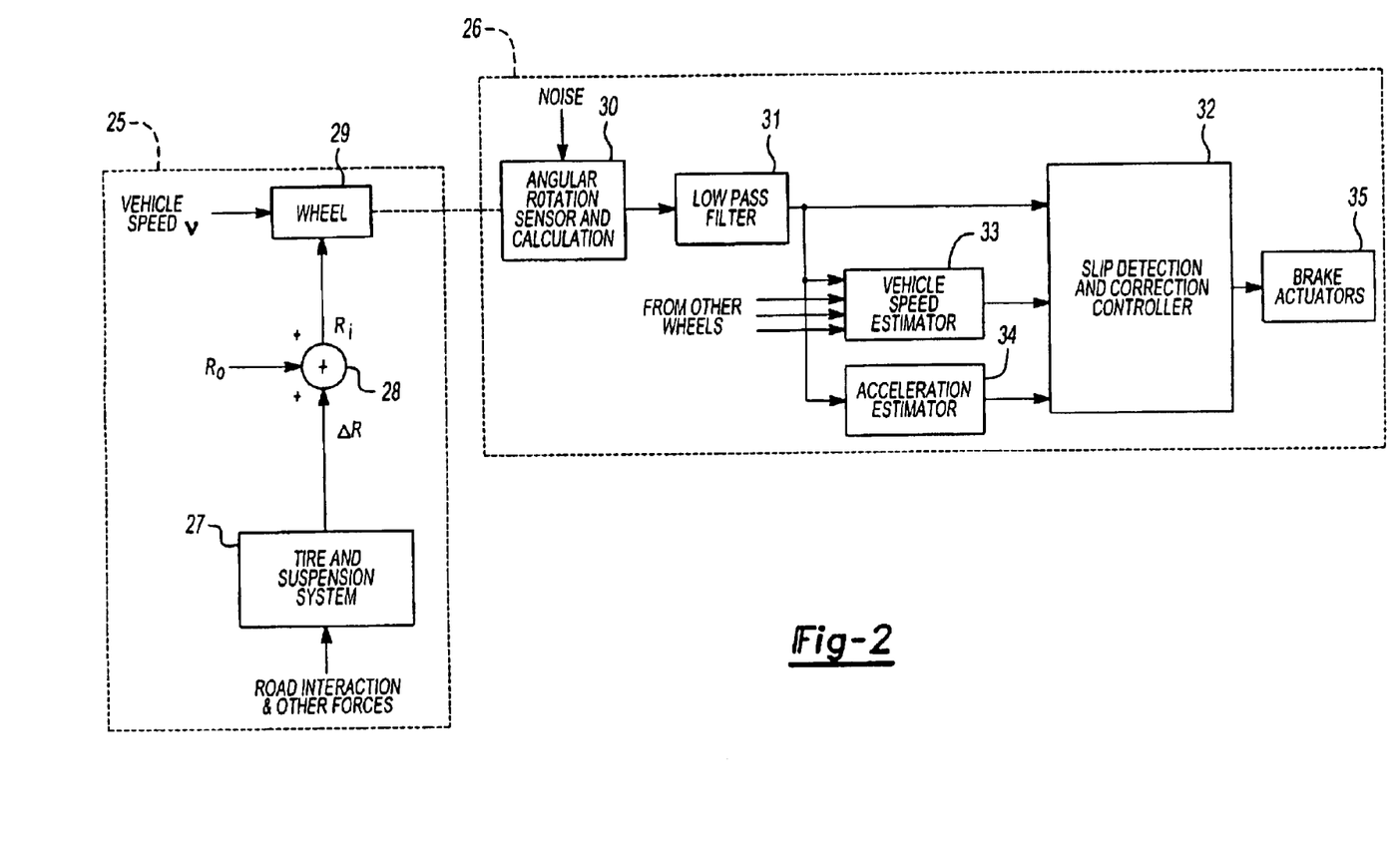
FIG. 2 is a block diagram showing a prior art braking system.

FIG. 2 shows further details of a prior art slip control system, such as an anti-lock brake (ABS) system, traction control (TC) system, or vehicle stability control (VSC) system, including a physical portion 25 and a control portion 26. Physical portion 25 includes tire and suspension system 27 which is subjected to road interaction and other forces as the vehicle moves. Based on wheel rim size and nominal tire shape, the rolling radius for any particular vehicle wheel is approximately a nominal rolling radius $R_0$. Tire deflection in response to the various forces acting on the tire causes a rolling radius deviation $\Delta R$ to be superimposed on the nominal value in a summation 28. Wheel 29 then spins with an instantaneous rolling radius $R_i$ in direct response to the vehicle speed v. Thus, even though the physical wheel 29 is spinning at a rate dependent upon instantaneous rolling radius $R_i$, prior art systems determine wheel speed as though it depended on $R_0$.

Control portion 26 includes an angular rotation sensor and calculation block 30 to produce a longitudinal wheel speed signal which is filtered in a lowpass filter 31. The filtered longitudinal speed is input to a slip detection and correction controller 32, a vehicle speed estimator 33, and an acceleration estimator 34. Estimators 33 and 34 have their outputs coupled to controller 32. The output of slip detection and correction controller 32 is coupled to brake actuators 35 which are actuated as needed to limit wheel slip.

The variation in rolling radius results in an additive noise in the output of sensor 30. To avoid false detection of wheel slip and false activation of brake actuators 35, the sensor output is filtered in lowpass filter 31 to at least partially remove the noise. This technique is partially effective since tire deflections occur with some of their frequencies above the frequencies of interest for slip detection. A cutoff frequency of about 20 Hz is typical for the lowpass filter in the prior art. However, the lowpass filtering also reduces performance when a false detection is not occurring by increasing the time required to detect the slippage.

Figure 3:
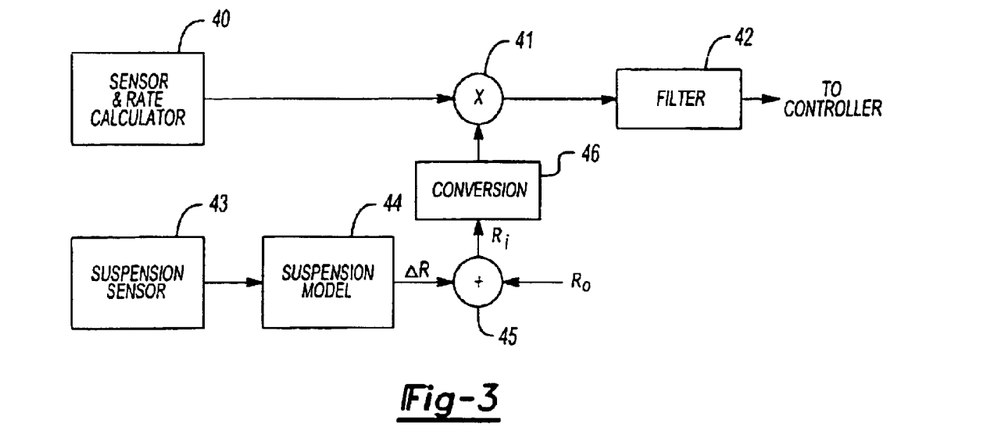
FIG. 3 is a block diagram showing a preferred embodiment of the wheel speed determination of the present invention.

An improved system is shown in FIG. 3. A sensor and rate calculator 40 provides an instantaneous angular rate signal to one input of a multiplier 41.

A suspension sensor 43 measures a suspension system operating characteristic and provides a signal to a suspension model 44. The suspension operating characteristic is at least in part representative of an instantaneous rolling radius of the vehicle wheel. Based on the suspension model, an instantaneous rolling radius deviation $\Delta R$ is determined. $\Delta R$ is added to the nominal rolling radius $R_0$ in a summer 45 to produce an instantaneous rolling radius $R_i$. If any particular units are desired for the longitudinal speed signal, a conversion factor can be applied in a conversion block 46, otherwise, the instantaneous rolling radius signal $R_i$ is applied directly to the second input of multiplier 41. By multiplying the instantaneous angular rate signal and the instantaneous rolling radius, the output of multiplier 41 provides an improved longitudinal speed signal. The output of multiplier 41 is lowpass filtered in a filter 42 and then provided to the slip controller.

Figure 4:
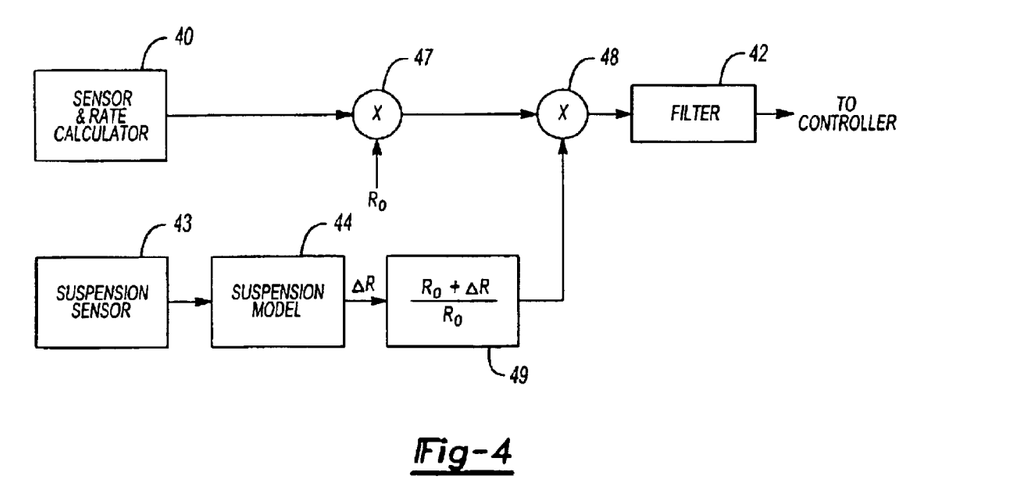
FIG. 4 is a block diagram showing another preferred embodiment of the wheel speed determination of the present invention.

An alternative embodiment is shown in FIG. 4 as an add-on to existing systems. While the embodiment of FIG. 3 modifies the initial calculation of longitudinal wheel speed itself, for existing products it may be more convenient to instead apply a correction factor to an existing calculation of wheel speed based on the nominal rolling radius. Since existing products typically implement the filtering and speed calculations digitally in software, it may sometimes be desirable to retain existing software code and to insert a patch that applies a correction factor to the prior art speed signal. Thus, FIG. 4 shows that an angular rate signal from sensor/rate calculator 40 is applied to one input of a multiplier 47. The nominal rolling radius $R_0$ is applied to the second input of multiplier 47, and a speed signal including any error from variation in the instantaneous rolling radius is coupled to a first input of a multiplier 48. Instantaneous rolling radius deviation $\Delta R$ from suspension model 44 is coupled to a correction factor calculator 49. A correction factor is calculated as the ratio of the actual instantaneous rolling radius $R_i$ (determined as the sum of nominal rolling radius $R_0$ and the instantaneous rolling radius deviation $\Delta R$) to the nominal rolling radius $R_0$. Thus, for decreases in instantaneous rolling radius (i.e., $\Delta R$ is negative), the correction factor is less than one and a properly reduced longitudinal speed determination is made. For increases in instantaneous rolling radius (i.e., $\Delta R$ is positive), the correction factor is greater than one and a properly increased longitudinal speed determination is made. Calculator 49 may include a summer for adding $R_0$ and $\Delta R$ followed by a gain equal to $1/R_0$, for example. The correction factor is coupled to a second input of multiplier 48 and a corrected longitudinal wheel is speed signal at the output of multiplier 48 is coupled to the slip controller through filter 42.

Figure 5:
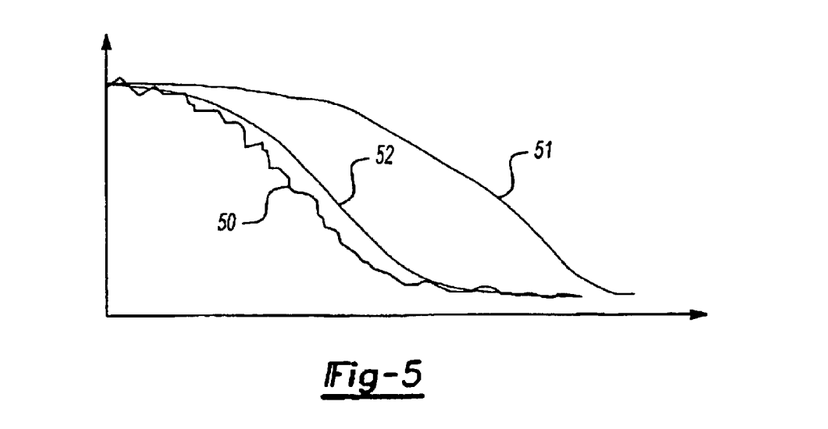
FIG. 5 is a plot showing an unfiltered wheel speed signal and a comparison of filtered signals between the invention and the prior art.

As a result of the improved accuracy of the longitudinal wheel speed determination, the need for filtering of the speed signal to avoid false activations is greatly reduced. While prior art filters used a typical cutoff frequency of about 20 Hz, the present invention can avoid false activation from remaining sources of random signal error while raising the cutoff frequency to 50 Hz. FIG. 5 shows a raw, unfiltered signal 50 from the angular rate sensor during a deceleration. A filtered signal 51 resulting from the prior art cutoff frequency shows a significant time lag before the deceleration can be detected. In contrast, the higher value of the cutoff frequency for a filtered signal 52 as enabled by the present invention more quickly follows the deceleration. Since the deceleration is more quickly detected, overall performance of the slip control system is greatly improved.

Figure 6:
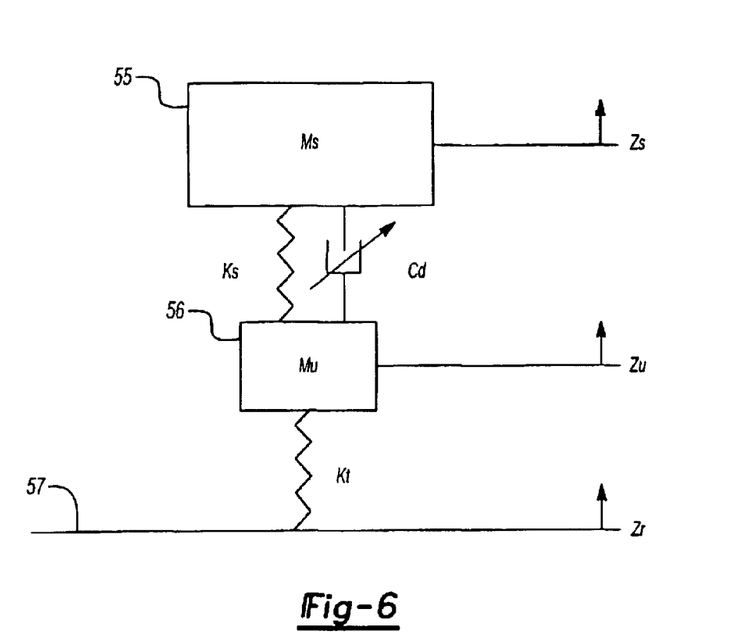
FIG. 6 is a schematic diagram showing a suspension model used in a preferred embodiment.

The suspension system model for determining deviation of the rolling radius will be discussed with reference to FIG.

6. Block 55 represents the sprung mass $M_s$ of a vehicle and block 56 the unsprung mass $M_u$. There is a spring constant $K_s$ between block 55 and block 56 and a spring constant $K_t$ between block 56 and the ground 57. There is also a damning constant $C_d$ between blocks 55 and 56. The model further includes height $Z_s$ of the sprung mass, height $Z_u$ of the unsprung mass, and height $Z_r$ above terrain.

In a preferred embodiment, the suspension system model is implemented using a Kalman filter. The Kalman filter is designed using the constant coefficient linear time-invariant plant model of FIG. 6. This assumption potentially reduces the accuracy of the estimation to a small operating region about an equilibrium point. The range of the operating region is dependent on the nonlinear nature of the system. To increase the accuracy over a larger range of the operating region, the extended Kalman filter implementation could be used. However, such design would be computation intensive and not as well suited for RAM/ROM and loop time constrained systems. A Kalman filter is useful is reducing the effects of process disturbances and measurement noise on the estimation process. The fact that the plant model used in the preferred embodiment contains constant coefficients means that the robustness of the estimation is limited to a certain variance in the constants. Therefore, changes in the actual plant versus the initial model will cause error in the estimation process. The variance allowed in each of the model parameters can be defined based on the accuracy requirement of the estimation.

The design of the Kalman filter assumes the following state definitions:

$$x_1 = Z_s - Z_u$$

$$x_2 = \dot{Z}_s$$

$$x_3 = Z_u - Z_r$$

$$x_4 = \dot{Z}_u$$

The following state equations are derived from the free body diagram of FIG. 6:

$$\dot{x}_1 = x_2 - x_4$$

$$\dot{x}_2 = \frac{1}{M_s}(-K_s x_1 + F_d + 0.4 K_s)$$

$$\dot{x}_3 = x_4 - \dot{Z}_r$$

$$\dot{x}_4 = \frac{1}{M_u}(K_s x_1 - K_t x_3 - F_d + (0.075 K_t - 0.4 K_s))$$

Assuming the input $u = F_d$, the process disturbance $v = \dot{Z}_r$, and the acceleration offset $0.4\, K_s/M_s$ and $(0.075\, K_t - 0.4\, K_s)/M_u$, the following state space representation is defined:

$$\dot{x} = \begin{bmatrix} 0 & 1 & 0 & -1 \\ \frac{-K_s}{M_s} & 0 & 0 & 0 \\ 0 & 0 & 0 & 1 \\ \frac{K_s}{M_s} & 0 & \frac{-K_t}{M_u} & 0 \end{bmatrix} x + \begin{bmatrix} 0 \\ \frac{1}{M_s} \\ 0 \\ \frac{-1}{M_u} \end{bmatrix} u + \begin{bmatrix} 0 \\ 0 \\ -1 \\ 0 \end{bmatrix} v + \begin{bmatrix} 0 \\ \frac{0.4 K_s}{M_u} \\ 0 \\ \frac{(0.075 K_t - 0.4 K_s)}{M_u} \end{bmatrix}$$

$$y = [1\ 0\ 0\ 0] x + w$$

$$\dot{x} = Ax + Bu + Gv + \Lambda$$

$$y = Cx + w$$

$$x_0 = [x_{s0} - x_{u0}\ 0\ x_{u0}\ 0]$$

The process disturbance v(t) and the measurement noise w(t) are stationary, zero mean, Gaussian white processes with covariance kernels of $$E\{v(t)v^T(\tau)\} = V\delta(t-\tau)$$

$$E\{w(t)w^T(\tau)\} = W\delta(t-\tau).$$

Note that $V \geq 0$ because it is a covariance matrix. Also assume that $W > 0$. This assumption states that the noise affects all the measured outputs of the system, i.e., there are "no clean measurements."

Assume that the initial state has mean and covariance given by

Mean:

$$E\{x(t_0)\} = \bar{x}_0$$

Covariance:

$$E\{[x(t_0) - \bar{x}_0][x(t_0) - \bar{x}_0]^T\} = \Sigma_0$$

and that v, w, and $x(t_0)$ are mutually uncorrelated.

Consider $\hat{x}(t)$ an estimate of the state of the system at time $t \geq t_0$. Define the estimation error: $e(t) = x(t) - \hat{x}(t)$ and the mean square estimation error: $E\{e(t)e(t)^T\}$. Suppose that the input and (measured) output of the system for all prior times: u(t), y(t), $t \geq t_0$ are known. The problem is then to use this information to construct an estimate $\hat{x}(t)$ such that the mean square estimation error is minimized.

It turns out that the estimate $\hat{x}(t)$ that minimizes the mean square error may be generated as the state of a dynamical system with the structure of an observer with a time-varying gain, L(t). The assumption is made that the estimation process is done for an arbitrarily long time, i.e., that $t_0 \rightarrow -\infty$. This assumption allows a constant estimator gain, L, to be designed by solving the dual Algebraic Riccatti equation:

$$\bar{\Sigma} A^T + A \bar{\Sigma} + V - \bar{\Sigma} C^T W^{-1} C \bar{\Sigma}$$

$$L = \bar{\Sigma} C^T W^{-1}$$

Assuming (A,C) is detectable, then the primary design step is to choose the appropriate V and W such that the estimator has the appropriate properties, e.g., accuracy, bandwidth, and noise rejection. There exist some tactics in the literature for approaching the selection of V and W. Using the design of L, the Kalman filter implementation becomes $$\dot{\hat{x}} = A\hat{x} + Bu + L(y - C\hat{x}) + \Lambda$$

$$z = [0\ 0\ 1\ 0] x$$

where z is the state output of interest.

Using this filter design to model the suspension system, a filter output equal to instantaneous rolling radius deviation from nominal, $\Delta R$, is obtained.

While the model shown employs sprung mass height or strut position as a measured input to derive $\Delta R$, the model could alternatively be designed to employ other suspension system operating characteristics such as strut velocity, strut force, strut internal pressures, bushing deflections, hub acceleration, body acceleration, tire stress, tire deflection, road position, and suspension member strain. Derivation of such models is within the skill of one normally skilled in the art.

Figure 7:
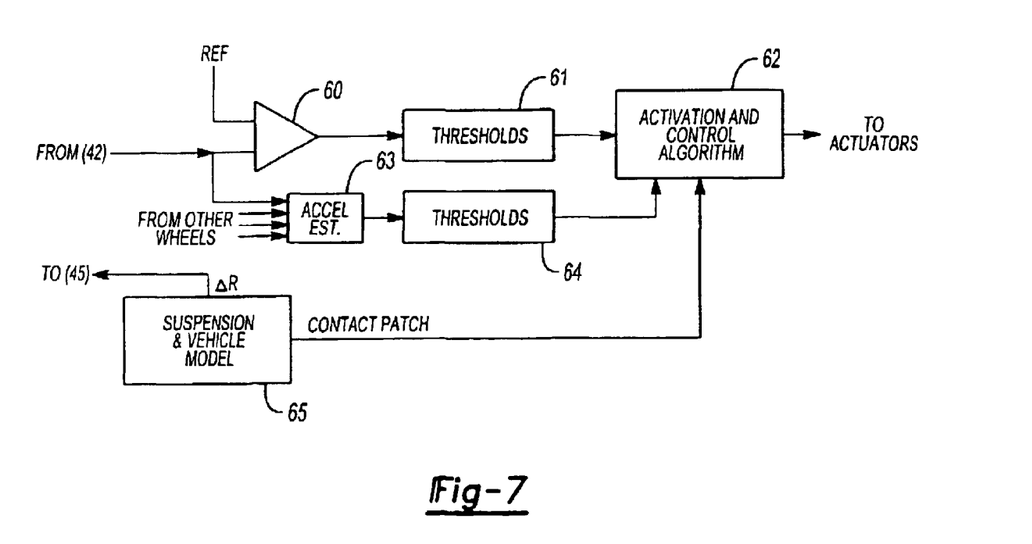
FIG. 7 is a block diagram showing another preferred embodiment of the invention.

Further improvements to the slip control system are shown in FIG. 7. As a result of having a more accurate longitudinal wheel speed, other ameliorative actions taken in system design to avoid false activations can be reduced. For example, activation thresholds were previously set to produce a slower response to slip due to the possibility of signal error. Since signal error is reduced with the present invention, the activation thresholds can be tightened up to improve performance. Thus, FIG. 7 shows a difference block 60 which compares the improved longitudinal wheel speed signal to a reference signal. The reference signal represents the expected longitudinal wheel speed based on a determination of the overall vehicle speed. The difference signal represents any slip that is occurring at the particular wheel. The difference signal is coupled to a threshold block 61. When slip exceeds the thresholds, then an activation signal is sent to an activation and control algorithm block 62. Other than a tightening or reduction of thresholds, threshold block 61 and algorithm block 62 perform in a conventional manner.

Known slip control systems also monitor individual wheel speed accelerations to detect slip. Due to the greater mass of the whole vehicle, vehicle acceleration is much more constrained than is wheel acceleration. Thus, a measured wheel acceleration outside the range of the overall vehicle is also an indication of wheel slip. Wheel and overall vehicle acceleration estimates are determined in an acceleration estimate block 63 and are coupled to a threshold block 64. Since the acceleration calculations are more accurate using the present invention, the thresholds used in block 64 can be more aggressive that those of the prior art.

In yet another improvement, the present invention employs a suspension and vehicle model 65 with an additional output representative of the contact patch of the individual tire at any given moment. Contact patch is the footprint of the portion of the tire actually in contact with the road. This can be determined by model 65 in response to the instantaneous rolling radius, for example. The contact patch signal is coupled to activation and control algorithm 62 which modifies its operation (e.g., braking force) based on the likelihood of slip at various amounts of contact patch.

The suspension modeling of the present invention can be implemented within a control module for a slip control system, such as ABS, TC, or VSC, since these modules typically already contain the necessary hardware. However, when an active suspension control system is present which also performs modeling, it may be desirable to perform portions of the invention in a suspension module. Therefore, integration of a suspension control system with a braking control system is discussed below.

Figure 8:
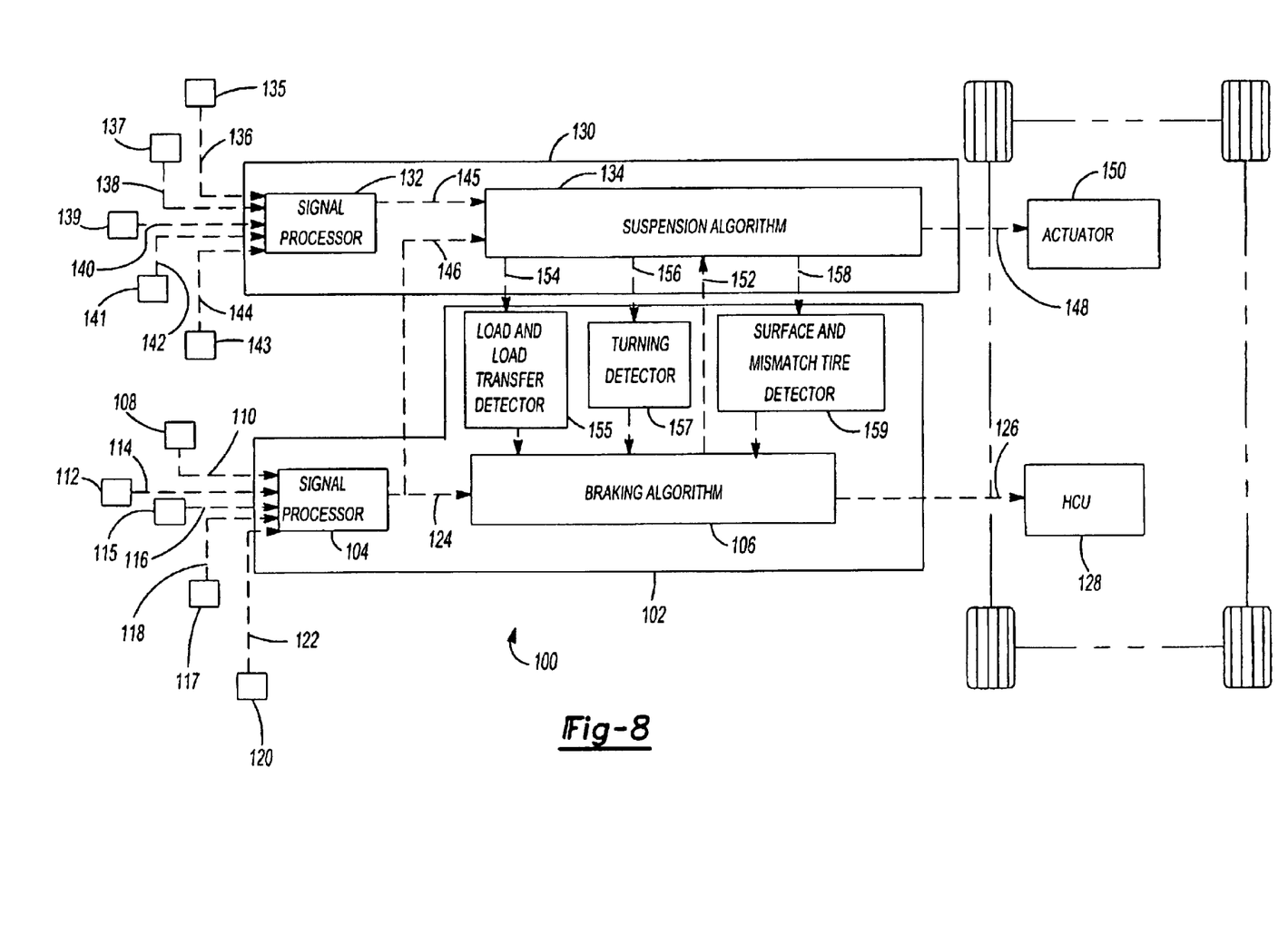
FIG. 8 is a schematic diagram of an integrated vehicular control system useful in practicing the present invention.

A first embodiment of an integrated vehicular control system is indicated generally at 100 in FIG. 8. The control system 100 is particularly adapted to control fluid pressure in an electronically-controlled vehicular braking system and an electronically-controlled vehicular suspension system. The braking system can include anti-lock braking, traction control, and vehicle stability control functions. The suspension system can include active damping functions.

The control system 100 includes a first electronic control unit (ECU) 102. The first ECU 102 includes a signal processor 104 and a braking algorithm 106. Various sensors 108 strategically placed in a vehicle deliver input signals 110 to the signal processor 104. Specifically, a lateral acceleration sensor 112 delivers an input signal 114 to the signal processor 104. A longitudinal acceleration sensor 115 delivers an input signal 116 to the signal processor 104. A steering wheel sensor 117 delivers an input signal 118 to the signal processor 104. A yaw rate sensor 120 delivers an input signal 122 to the signal processor 104. Depending upon the braking functions of the braking system, some of the above-listed sensors and their associated input signals may be deleted and others may be added. For example, a braking system that provides only ABS and TC functions may not require some of the above-listed sensors.

The signal processor 104 delivers transfer signals 124 to the braking algorithm 106. The braking algorithm 106 delivers output signals 126 to a hydraulic control unit (HCU) 128. The HCU 128 can include electromechanical components such as digital and/or proportional valves and pumps (not illustrated). The HCU 128 is hydraulically connected to wheel brakes and a source of brake fluid, neither of which is illustrated.

The control system 100 also includes a second ECU 130. The second ECU 130 includes a signal processor 132 and a suspension algorithm 134. Various sensors 135 strategically placed in a vehicle deliver input signals 136 to the signal processor 132. Specifically, a suspension state sensor 137 delivers an input signal 138 to the signal processor 132. A suspension displacement sensor 139 delivers an input signal 140 to the signal processor 132. A relative velocity sensor 141 delivers an input signal 142 to the signal processor 132. An unsprung mass acceleration sensor 143 delivers an input signal 144 to the signal processor 132. Depending upon the performance requirements of the suspension system, some of the above-listed sensors may be deleted and others may be included.

The second signal processor 132 delivers transfer signals 145 to the suspension algorithm 134. The first signal processor 104 delivers transfer signals 146 to the suspension algorithm 134. The suspension algorithm 134 delivers output signals 148 to suspension actuators 150, only one of which is illustrated. The actuators 150 are electrically controlled devices such as dampers that vary and control a damping rate of a vehicle. An actuator 150 can include electromechanical components such as digital and proportional valves.

Information from the vehicular braking system can be shared with the vehicular suspension system. For example, ECU 102 can direct information to ECU 130. One example of transferred information from the braking system to the suspension system is the transfer signal 146 from signal processor 104 to suspension algorithm 134. A second example of transferred information from the braking system to the suspension system is indicated by transfer signal 152, wherein information from the braking algorithm 106 is directed to the suspension algorithm 134.

Information from the suspension system can also be shared with the braking system. For example, ECU 130 can direct information to ECU 102. One example of transferred information from the suspension system to the braking system is a transfer signal 154 to a load and load transfer detector 155. Another example is a transfer signal 156 to a turning detector 157. Yet another example is a transfer signal 158 for surface and mismatch tire detector 159.

The control system 100 can be configured in various manners to share information from ECU 102 to ECU 130, and vice versa. In one example, an ECU 102 for the braking system that receives inputs signals 114, 116, 118 and 122, for lateral acceleration, longitudinal acceleration, steering wheel angle, and yaw rate, respectively, can transfer these input signals to ECU 130 for the suspension system. The signal processor 104 of ECU 102 can send transfer signal 146 to the suspension algorithm 134.

In another example, if lateral acceleration and steering wheel angle signals 114 and 122 are not available to the braking system, a turning detector signal can be generated by ECU 130 and transmitted to ECU 102 to improve braking performance. If an electronically controlled suspension system is integrated with an electronically controlled ABS/TC braking system, turning of the vehicle can be detected by the suspension system, thereby generating a turning detector signal that is transmitted to a braking system that does not receive signals from lateral acceleration and steering wheel angle sensors. A turn detection signal to the braking system via ECU 102 can enhance braking performance, particularly during braking-in-turn and accelerating-in-turn.

Figure 9:
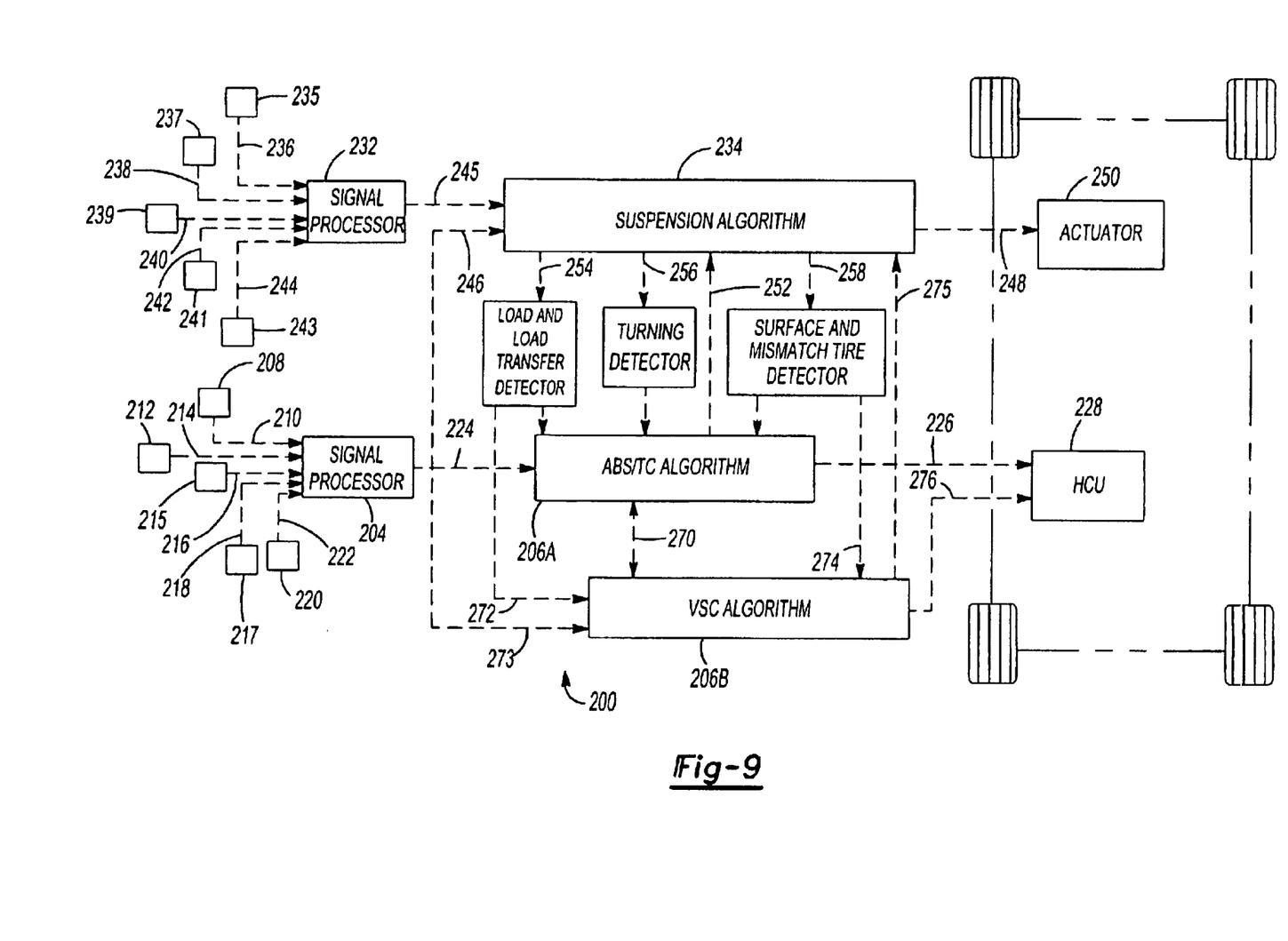
FIG. 9 is a schematic diagram of another embodiment of an integrated vehicular control system.

A second embodiment of an integrated control system for controlling vehicular braking and suspension functions is indicated generally at 200 in FIG. 9. Elements of control system 200 that are similar to elements of control system 100 are labeled with like reference numerals in the 200 series.

Control system 200 also includes an ABS/TC algorithm 206A and a VSC algorithm 206B in place of the braking algorithm 106 of control system 100. Signal processors 204 and 232 may be placed separately from their respective algorithms 206A, 206B, and 230, or they may be located in common ECU's (not illustrated in FIG. 9). Transfer signal 270 between ABS/TC algorithm 206A and VSC algorithm 206B is provided. Transfer signal 272 for load and load transfer is provided to the VSC algorithm 206B. Transfer signal 273 from the signal processor 204 is provided to the VSC algorithm 206B. Transfer signal 274 for the surface and mismatch tire detector is provided to the VSC algorithm 206B. Transfer signal 275 is provided from the VSC algorithm 206B to the suspension algorithm 234. Output signal 276 is sent from the VSC algorithm 206B to the HCU 228.

Various calculations can be made for the suspension system. For example, relative velocity can be calculated from suspension displacement if it is not directly measured. A vehicle load and load transfer signal 154, 254 can also be calculated or enhanced from a lateral acceleration signal 114, a longitudinal acceleration signal 118, and a steering wheel angle signal 122 when these are available.

A load and load transfer signal 154, 254 is used by the braking algorithms to enhance braking torque proportioning and apply and dump pulse calculations.

A turning detector signal 156, 256 (roll moment distribution) can be used to optimize vehicle handling before VSC activation and enhance brake torque distribution calculation during VSC activation.

A road surface roughness and tire mismatching signal 158, 258 can be detected from suspension states and used by ABS/TC and VSC systems.

Braking/traction status information from the wheels can also be used to enhance braking algorithms by predicting pitch and roll motion in advance.

Suspension algorithms and braking algorithms can be embodied in separate ECU's 102 and 130 as illustrated in FIG. 8. In other embodiments, the suspension and braking algorithms can be integrated into a single electronic control unit.

If steering wheel angle signal 122, 222 and/or a lateral acceleration signal 114, 214 are available, then split mu detection in ABS and TC algorithms (for stand alone ABS and TC systems) can be improved.

In other examples, ECU 102 can only receive information from ECU 130. Thus, various input signals from the suspension system can be transferred to the braking system, but no signals are transferred from the braking system to the suspension system.

In yet other examples, ECU 130 can only receive information from ECU 102. Thus, various input signals from the braking system can be transferred to the suspension system, but no signals are transferred from the suspension system to the braking system.

Figure 10:
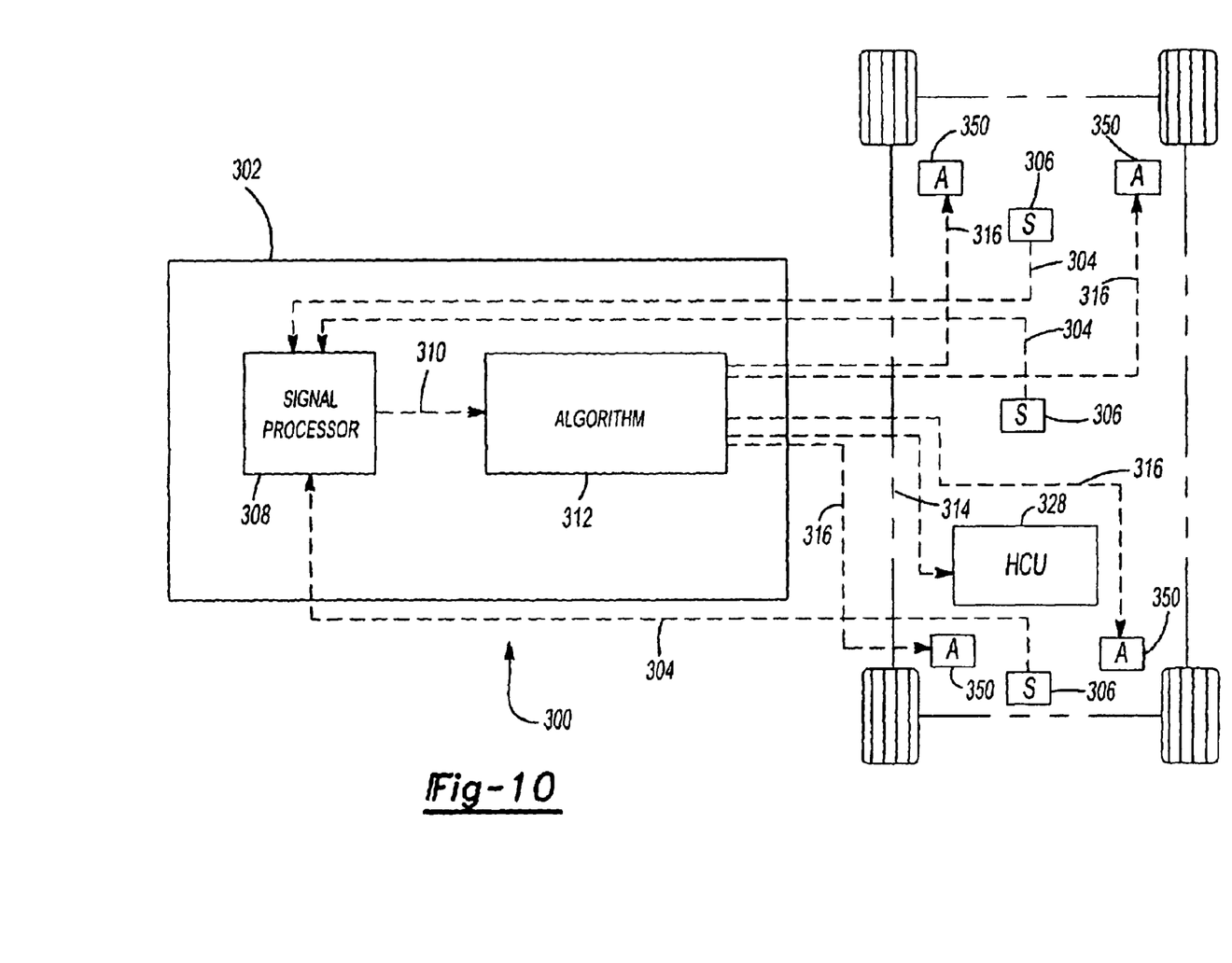
FIG. 10 is a schematic diagram of yet another embodiment of an integrated vehicular control system.

A third embodiment of an integrated control system for controlling vehicular braking and suspension functions is indicated generally at 300 in FIG. 10. In control system 300, a single ECU 302 receives inputs signals 304 from various sensors 306 strategically placed in a vehicle. A signal processor 308 may be incorporated in the ECU 302 that delivers transfer signals 310 to an algorithm 312. The algorithm 312 delivers output signals 314 to a HCU 328 to provide a desired brake response. The algorithm 312 also delivers output signals 316 to actuators 350 to provide a desired suspension response. Control system 300 may be referred to as a totally integrated system for controlling vehicular braking and suspension.

What is claimed is:

1. A method for determining longitudinal speed of a vehicle wheel for use in a vehicle slip control system comprising:

measuring an instantaneous angular rate of a vehicle wheel via an individual wheel speed sensor;

measuring at least one operating characteristic of a portion of a vehicle suspension system associated with said vehicle wheel, said suspension operating characteristic at least in part representative of an instantaneous rolling radius of said vehicle wheel;

determining an instantaneous rolling radius deviation corresponding to said vehicle wheel in response to said suspension operating characteristic; and generating a longitudinal wheel speed signal in response to said instantaneous angular rate and said instantaneous rolling radius deviation.

2. The method according to claim 1 further including the step of utilizing said longitudinal wheel speed signal in said vehicle slip control system to detect wheel slip.

3. The method according to claim 1 wherein said at least one suspension operating characteristic includes at least one of strut position, strut velocity, strut force, strut internal pressures, bushing deflections, hub acceleration, body acceleration, tire stress, tire deflection, road position, and suspension member strain.

4. The method according to claim 1 wherein said instantaneous rolling radius deviation is determined by inputting said measured suspension operating characteristic into a Kalman filter mathematical model of said vehicle suspension system.

5. The method of claim 1 further comprising the steps of:

determining an actual instantaneous rolling radius in response to said instantaneous rolling radius deviation and a predetermined nominal rolling radius; and multiplying said instantaneous angular rate by said actual instantaneous rolling radius.

6. The method of claim 1 further comprising the steps of:

multiplying said instantaneous angular rate by a predetermined nominal rolling radius to produce a nominal wheel speed; and multiplying said nominal wheel speed by a correction factor comprised of a ratio of a sum of said predetermined nominal rolling radius and said instantaneous rolling radius deviation to said predetermined nominal rolling radius.

7. The method of claim 2 further comprising the steps of:

determining a contact patch in response to said suspension operating characteristic; and modifying braking force applied by said slip control system in response to said contact patch.

8. Vehicle apparatus comprising:

an angular position sensor for measuring an angular rotation rate of a wheel of said vehicle;

a suspension sensor for measuring a suspension operating characteristic of a portion of a vehicle suspension system associated with said wheel, said suspension operating characteristic being related to an instantaneous rolling radius of said wheel; and a controller coupled to said angular position sensor and said suspension sensor, said controller determining an instantaneous rolling radius deviation for said wheel in response to said suspension operating characteristic and generating said longitudinal wheel speed signal in response to said angular rotation rate and said instantaneous rolling radius deviation.

9. The vehicle apparatus of claim 8 wherein said suspension operating characteristic is at least one of strut position, strut velocity, strut force, strut internal pressures, bushing deflections, hub acceleration, body acceleration, tire stress, tire deflection, road position, and suspension member strain.

10. The vehicle apparatus of claim 8 wherein said controller includes a suspension model relating said suspension operating characteristic to said instantaneous rolling radius of said wheel.

11. The vehicle apparatus of claim 10 wherein said model is comprised of a Kalman filter.

12. The vehicle apparatus of claim 8 further comprising a braking actuator, wherein said controller detects wheel slip in response to said longitudinal wheel speed signal and actuates said braking actuator to limit said wheel slip.

13. A method of anti-lock braking for a vehicle, said method comprising the steps of:

generating an angular rotation rate signal for a wheel of said vehicle, said angular rotation rate signal producing pulses in response to predetermined amounts of rotation at a rotation axis of said wheel;

generating a suspension signal in response to at least one operating characteristic of a portion of a vehicle suspension system associated with said vehicle wheel, said suspension operating characteristic being related to an instantaneous rolling radius of said vehicle wheel;

modeling said vehicle suspension system to generate an instantaneous rolling radius deviation in response to said suspension signal;

generating a corrected instantaneous wheel speed signal in response to said instantaneous rolling radius deviation and said angular rotation signal; and detecting wheel slip in response to said corrected instantaneous wheel speed signal.

14. The method of claim 13 further comprising the step of:

lowpass filtering said corrected instantaneous wheel speed signal, said lowpass filtering having a cutoff frequency of about 50 Hz.

15. The method of claim 13 wherein said corrected instantaneous wheel speed signal is generated using the steps of:

summing said instantaneous rolling radius deviation with a predetermined nominal rolling radius to generate an actual rolling radius signal; and multiplying said angular rotation rate signal by said actual rolling radius signal.

16. The method of claim 13 further comprising the steps of:

generating a contact patch signal in response to said instantaneous rolling radius deviation; and limiting braking forces in response to said contact patch signal.

* * * * *